United States Patent
Vine et al.

(10) Patent No.: US 12,235,100 B2
(45) Date of Patent: Feb. 25, 2025

(54) METHODS AND SYSTEMS FOR DETERMINING A THICKNESS OF AN ELONGATE OR EXTENDED STRUCTURE

(71) Applicant: Guided Ultrasonics Ltd, Brentford (GB)

(72) Inventors: Keith Vine, Brentford (GB); Thomas Vogt, Brentford (GB); Stefan Joshua Milewczyk, Brentford (GB)

(73) Assignee: Guided Ultrasonics Ltd, London (GB)

( * ) Notice: Subject to any disclaimer, the term of this patent is extended or adjusted under 35 U.S.C. 154(b) by 1056 days.

(21) Appl. No.: 17/052,117

(22) PCT Filed: Oct. 9, 2019

(86) PCT No.: PCT/GB2019/052865
§ 371 (c)(1),
(2) Date: Oct. 30, 2020

(87) PCT Pub. No.: WO2020/074895
PCT Pub. Date: Apr. 16, 2020

(65) Prior Publication Data
US 2021/0108916 A1  Apr. 15, 2021

(30) Foreign Application Priority Data
Oct. 10, 2018 (GB) .................................. 1816552

(51) Int. Cl.
*G01B 17/02* (2006.01)
(52) U.S. Cl.
CPC .................................. *G01B 17/02* (2013.01)
(58) Field of Classification Search
CPC .... B06B 1/085; G01N 29/041; G01N 29/043; G01N 29/07; G01N 29/2412; G01N 29/04;
(Continued)

(56) References Cited

U.S. PATENT DOCUMENTS

| 4,305,294 A | 12/1981 | Vasile et al. |
| 5,619,423 A | 4/1997 | Scrantz |

(Continued)

FOREIGN PATENT DOCUMENTS

| CN | 108226277 A | 6/2018 |
| EP | 3318869 A1 | 5/2018 |

(Continued)

OTHER PUBLICATIONS

Joseph, Using ultrasonic guided wave mode cutoff for corrosion detection and classification (Year: 1998).*

(Continued)

*Primary Examiner* — Daniel L Murphy
*Assistant Examiner* — Amie M Ndure
(74) *Attorney, Agent, or Firm* — McCarter & English, LLP

(57) ABSTRACT

A method of determining a thickness of an elongate or extended structure using elastic waves is disclosed. The method comprises receiving at least one time-domain signal from a transducer, generating a frequency-domain signal in dependence upon the at least one time-domain signal, reducing noise in the frequency-domain signal to provide a de-noised frequency-domain signal, comparing the de-noised frequency-domain signal with at least two reference signals, each reference signal corresponding to a respective thickness; and determining the thickness of the elongate or extended structure in dependence comparing the de-noised frequency-domain signal with the at least two reference signals.

20 Claims, 15 Drawing Sheets

(58) Field of Classification Search
CPC .............. G01N 29/46; G01N 29/4436; G01N 29/4472; G01N 29/343; G01N 2291/0425; G01N 2291/0258; G01N 2291/02854; G01N 2291/102; G01N 2291/2634

See application file for complete search history.

(56) References Cited

U.S. PATENT DOCUMENTS

| | | | |
|---|---|---|---|
| 5,965,818 | A | 10/1999 | Wang |
| 5,970,434 | A | 10/1999 | Brophy et al. |
| 2014/0190264 | A1 | 7/2014 | Barshinger et al. |
| 2014/0208852 | A1 | 7/2014 | Instanes et al. |
| 2015/0233710 | A1 | 8/2015 | Simonetti et al. |
| 2015/0247823 | A1 | 9/2015 | Gil et al. |

FOREIGN PATENT DOCUMENTS

| | | | | |
|---|---|---|---|---|
| GB | 2403009 A | | 12/2004 | |
| GB | 2545044 A | * | 6/2017 | ............. G01B 17/02 |
| GB | 2552858 A | | 2/2018 | |
| JP | 55-058418 A | | 5/1980 | |
| JP | 1-219506 A | | 9/1989 | |
| JP | 5-332758 A | | 12/1993 | |
| JP | 2007-309838 A | | 11/2007 | |
| JP | 2011-128043 A | | 6/2011 | |
| JP | 2013-210200 A | | 10/2013 | |
| JP | 2017-151872 A | | 8/2017 | |
| WO | 2001/63276 A1 | | 8/2001 | |
| WO | 2018/029445 A1 | | 2/2018 | |

OTHER PUBLICATIONS

Canadian Office Action for Application No. 3,031,163, dated Aug. 12, 2022, 8 pages.

Jenot et al., Corrosion thickness gauging in plates using Lamb wave group velocity measurements. Measurement Science and Technology. 2001;12(8):1287.

European Office Action for Application No. 22190609.2, dated Dec. 23, 2022, 10 pages.

Chinese Office Action for Application No. 201980070691.3, dated Jul. 29, 2023, 13 pages.

Lowe et al., Long Range Guided Wave Inspection Usage—Current Commercial Capabilities and Research Directions 40 pages, Mar. 29, 2006.

Rose et al., Using Ultrasonic Guided Wave Mode Cutoff for Corrosion Detection and Classification. 1998 IEEE Ultrasonics Symposium. Jan. 1, 1998;1:851-854.

International Search Report and Written Opinion for Application No. PCT/GB2019/052865, dated Jan. 20, 2020, 15 pages.

United Kingdom Office Action for Application No. GB 1816552.2, dated Apr. 11, 2019, 11 pages.

* cited by examiner

METHODS AND SYSTEMS FOR DETERMINING A THICKNESS OF AN ELONGATE OR EXTENDED STRUCTURE

CROSS REFERENCE TO RELATED APPLICATIONS

This application is a U.S. national stage filing, under 35 U.S.C. § 371 (c), of International Application No. PCT/GB2019/052865, filed on Oct. 9, 2019, which claims the benefit of priority to United Kingdom Patent Application No. 1816552.2, filed on Oct. 10, 2018. The entire contents of each of the aforementioned applications are incorporated herein by reference.

FIELD

The present invention relates to determining a thickness of an elongate or extended structure, such as a wall of a pipe or a plate, using elastic guided waves.

BACKGROUND

Guided waves can be used to inspect pipes, rails, rods, plates and other types of structures for corrosion-type defects, cracks and other types of flaws.

Guided waves may be used for the rapid screening of structures over long ranges extending, for example, over tens or hundreds of metres from a single sensor position.

Moreover, guided waves can be used to inspect structures that are coated or insulated, which are difficult to access (for example, due to being buried or being underwater) and/or while they are in use.

An overview of the capabilities of long-range guided wave testing systems can be found in M. Lowe and P. Cawley: "Long Range Guided Wave Inspection Usage—Current Commercial Capabilities and Research Directions" (2006) (http://www3.imperial.ac.uk/pls/portallive/docs/1/55745699.PDF).

Guided wave testing typically employs frequencies below 100 kHz using torsional (T(0,1) or longitudinal (L(0,2)) modes. These modes are used since they are sensitive at these frequencies to cross-sectional loss at any location through the pipe wall thickness or around the circumference, can be easy to excite and are generally non-dispersive over a wide frequency band. The long-range guided wave method traditionally provides only qualitative information on the existence of irregularities within said pipe-wall resulting from defects, e.g., ensuing corrosion.

Reference is made to US 2006/203086 A1 which describes synthesising a wideband signal for guided wave testing.

In addition to the guided wave test, often there is a need to measure thickness of a structure (such as a pipe wall) to help, reduce or avoid leakages (in the case of a pipe), assess the remaining life of the structure or for other reasons. Typically, this is performed using a pulse-echo dual-element transducer operating in the range of several megahertz, for example, as described in C. Lebowitz and L. Brown: "Ultrasonic Measurement of Pipe Thickness", Review of Progress in Quantitative Nondestructive Evaluation, volume 12, page 1987, (Plenum Press, New York 1993). Using a separate thickness gauge can increase cost and complexity. Most thickness gauges tend to be handheld devices, not intended to be installed.

SUMMARY

According to a first aspect of the present invention there is provided a method of determining a thickness of an elongate structure (such as a pipe or rail) or extended structure (such as a plate) using elastic waves. The method comprises receiving at least one time-domain signal from a transducer (for example, ultrasonic transducers, such as piezoelectric transducers or EMAT transducers), generating a frequency-domain signal in dependence upon the at least one time-domain signal, reducing noise in the frequency-domain signal to provide a de-noised frequency-domain signal, comparing the de-noised frequency-domain signal with at least one reference frequency-domain signal (or "reference signal"), each reference signal corresponding to a respective wall thickness, and determining the thickness of the wall in dependence upon comparing the de-noised frequency-domain signal with the at least one reference signal. The reference signal(s) may be synthesised. The transducer may be an ultrasonic transducer.

The method may comprise receiving at least two time-domain signals from the transducer. Generating the frequency-domain signal may comprise combining signals in the time-domain or the frequency domain. For example, generating the frequency-domain signal may comprise combining the at least two time-domain signals. Generating the frequency-domain signal may comprise combining the at least two time-domain signals into a single, combined time-domain signal and transforming the single, combined time-domain signal into the frequency-domain signal. Alternatively, generating the frequency-domain signal may comprise transforming the at least two time-domain signals into at least two frequency-domain signals and combining the at least two frequency-domain signals the (single) frequency-domain signal.

The at least two time-domain signals may comprise three time-domain signals. The three time-domain signals may comprise first, second and third time-domain signals corresponding to measurements of first, second and third excitations at first, second and third frequencies respectively.

Reducing the noise in the frequency-domain signal preferably comprises reducing the coherent noise (which, for example, can arise from other modes). Reducing the noise in the frequency-domain signal may comprise performing Welch's method on the time-domain signal. Reducing the noise in the frequency-domain signal may comprise performing single-spectrum analysis. Reducing the noise in the frequency-domain signal may comprise reducing or removing incoherent noise from the frequency-domain signal.

The method may further comprise windowing each of the at least two time-domain signals prior to generating the frequency-domain signal.

Comparing the de-noised frequency-domain signal with at least one reference signal may comprise performing a convolution of the de-noised frequency-domain signal with each of the at least one reference signal(s). Comparing the de-noised frequency-domain signal with at least one reference signal may comprise performing a cross-correlation of the de-noised frequency-domain signal with each of the at least one reference signal(s).

Comparing the de-noised frequency-domain signal with at least one reference signal may comprise performing a matrix multiplication comprising multiplying a matrix (which may be labelled M) comprising a set of at least one reference signal (herein also referred to as a set of mask(s)) by a first vector (which may be labelled P) containing measured signal values for different frequencies to obtain a second vector (which may be labelled C). Each mask contains a series of values extending along a first direction (e.g., rows) corresponding to values at different frequencies. The masks are arranged along a second, orthogonal dimension (e.g., columns). The first vector contains a series of measured signal values extending along the second direction (e.g., columns). For example, the matrix may be a (p×q) matrix containing p masks and each mask containing q values, the first vector may be (q×1) (i.e., a column vector) and the second vectors may be a (p×1) vector (i.e., a row vector). The magnitude of each value in the second vector can be used to determine closeness of match. In particular, the highest value may indicate the closest match. The matrix multiplication can achieve substantially the same result as cross correlation but can do so using fewer calculations and so be performed faster and/or use less computational resources.

According to a second aspect of the present invention there is provided a method, using a single elastic wave measurement system, comprising performing a guided wave ranging measurement of a reference feature in an elongate or extended structure using at least one transducer in a first set of transducers to determine a value of a distance to the reference feature, calculating a multiplication factor for a velocity of a guided wave using the value of the distance and performing the method using an adjusted velocity. The transducers may be ultrasonic transducers.

Performing a guided wave ranging measurement preferably comprises using a T(0,1) mode (for example, for a pipe) or using an SH0 mode (for example, for a plate).

According to a third aspect of the present invention there is provided a method comprising receiving a nominal value of a thickness of an elongate or extended structure, providing an excitation signal to at least one transducer in a first set of transducers, and receiving guided wave(s) using at least one transducer in a second, different set of transducers. The excitation signal has a frequency range which contains a cut-off frequency of a dispersive guided wave mode in the elongate or extended structure (i.e., the frequency range is chosen dependent on the nominal value of the thickness). The transducers may be ultrasonic transducers.

According to a fourth aspect of the present invention there is provided a method comprising receiving a signal from at least one transducer in a set of transducers in an inspection ring (when, installed, the transducers may be distributed evenly around the circumference of the pipe), the signal having a frequency range lying between 100 kHz to 800 kHz, measuring a frequency of a characteristic feature contained in the signal, and determining a thickness of an elongate or extended structure using the frequency of the characteristic feature. The transducers are preferably ultrasonic transducers.

According to a fifth aspect of the present invention there is provided a method comprising providing at least one excitation signal to at least one transducer in a first set of transducers, the at least one excitation signals covering a sufficiently broad frequency range to contain cut-off frequencies for at least two dispersive guided wave modes in an elongate or extended structure and receiving guided waves using at least one transducer in a second, different set of transducers. The transducers may be ultrasonic transducers.

The sufficiently broad frequency range may be contained within a range between 50 kHz to 800 kHz and at least a portion of the sufficiently broad frequency range extends above 100 kHz.

According to a sixth aspect of the present invention there is provided a computer program which, when executed by at least one processor, causes the at least one processor to perform the method of the first, second, third, fourth, and/or fifth aspect of the present invention.

According to a seventh aspect of the present invention there is provided a computer program product comprising a computer-readable medium storing the computer program of the sixth aspect of the present invention.

According to an eighth aspect of the present invention there is provided apparatus for determining a thickness of a wall of an elongate or extended structure using elastic waves. The apparatus comprises at least one processor and memory. The at least one processor is configured to perform the method of the first, second, third, fourth, and/or fifth aspect of the present invention.

According to a ninth aspect of the present invention there is provided an elastic guided wave system for determining thickness of an elongate or extended structure, such as the thickness of a wall of a pipe or a plate. The system comprises first and second sets (or "rows") of transducers (for example, ultrasonic transducers, such as piezoelectric transducers or EMAT transducers) installed on an elongate structure (such as a pipe or rail) or extended structure (such as a plate) or installable on an elongate or extended structure such that, when installed, the first and second sets of transducers are spaced apart along or across the structure. The system also comprises guided wave instrumentation which is configured to provide at least one excitation signal to at least one transducer in the first set of transducers, the at least one excitation signal covering a sufficiently broad frequency range to contain cut-off frequencies for at least two dispersive guided wave modes in an elongate structure, and to receive guided waves using at least one transducer in the second set of transducers. The transducers may be ultrasonic transducers.

A section or portion of the structure may extend along a line or path in three-dimensional space which may be straight or curved. The line or path may be straight and so define a longitudinal or central axis. The line or path may include an arcuate portion, for example, a bend in a pipe or rail. Along the line or path, the structure may have uniform cross section (for example, it may be a pipe having the same inner and outer diameters or a rail having the same profile and dimensions). Alternatively, the structure need not have a uniform cross section. At a given point along the line or path the structure may have rotational symmetry (such as a pipe) or may not have rotational symmetry (such as rail).

A system which is used for a long-range guided wave testing can also be used to determine a thickness of a wall of the elongate or extended structure.

The guided wave instrumentation is preferably configured to excite the signal and receive the set of one or more excitations in a pitch-catch configuration. The guided wave instrumentation may, however, be configured to excite the signal and receive the excitation in a pulse echo configuration.

The system may comprise an inspection ring comprising the first and second rows of transducers, i.e., a single inspection ring can be used. However, two, separate inspection rings comprising the first and second rows of transducers can be used. The inspection ring may include more than two rows of transducers, for example, three or more rows.

The guided wave instrumentation may be configured to transmit guided waves using at least one transducer in the first set or row of transducers along a sector (or "part of a circumference"), a section or a side of the structure allowing a thickness of the structure in the sector, section or side to be determined. The guided wave instrumentation is configured to transmit guided waves using at least one transducer in the first set of transducers in another, different sector, section or side (preferably at a different time) for allowing a thickness of the structure in the other, different sector, section or side to be determined.

The guided wave instrumentation may be configured to receive guided waves using at least one transducer in the second set or row of transducers along a sector (or "part of a circumference"), a section or a side of the structure allowing a thickness of the structure in the sector, section or side to be determined. The guided wave instrumentation may be configured to receive guided waves using at least one transducer in the second set of ultrasonic transducers in another, different sector, section or side (preferably at a different time) for allowing a thickness of the structure in the other, different sector, section or side to be determined.

The sufficiently broad frequency range may be contained within a range between 50 kHz to 800 kHz and at least a portion of the sufficiently broad frequency range extends above 100 kHz, or above 130 kHz. Using lower frequencies, for example below 1 MHz, below 500 kHz or below 100 kHz, can help reduce sensitivity to surface roughness.

The sufficiently broad frequency range may be at least, 200 kHz, at least 300 kHz or at least 500 kHz.

The sufficiently broad frequency range, $\Delta f_w$, may be:

$$\Delta f_w > \frac{c_{s/l}}{\beta \cdot \text{wall thickness}}$$

where wall thickness is a nominal or actual thickness of the wall or plate and, if only shear horizontal modes are being considered $c_{s/l}$ is the shear speed, $c_s$, in the structure and $\beta=1$ and, if modes other than shear horizontal modes are being considered $c_{s/l}$ is the longitudinal wave speed, $c_l$, in the structure and $\beta=2$.

The at least one excitation signal may consist of at least two excitation signals whose frequency ranges overlap. The at least one excitation signal may consist of three excitation signals whose frequency ranges overlap. The at least two excitation signals may be generated at different times. The at least one excitation signal may generate shear horizontal waves in the elongate or extended structure. The set of one or more excitation signals may generate shear vertical, symmetric and/or antisymmetric mode waves in the plate-like portion of the elongated structure.

The system may further comprise apparatus for determining a thickness of a wall of a pipe using elastic guided waves. The apparatus may comprise at least one processor and memory. The at least one processor may be configured to generate a frequency-domain signal in dependence upon at least one time-domain signal received from the at least one transducer in the second row of transducers, to reduce noise in the frequency-domain signal to provide a de-noised frequency-domain signal, to compare the de-noised frequency-domain signal with at least one reference signal, each reference frequency-domain signal corresponding to a respective pipe wall thickness and to determine the thickness of the wall of the pipe in dependence comparing the de-noised frequency-domain signal with the at least one reference signal.

According to a tenth aspect of the present invention there is provided a guided wave system configured, in a first mode of operation (or "first operating mode" or "first state"), to perform guided wave testing of an elongate or extended structure and, in a second mode of operation (or "second operating mode" or "second state"), to measure thickness of a wall of the elongate or extended structure using through-thickness resonance. The system is or comprises a system of first aspect of the present invention. The system may be configured to perform the method of the first, second, third, fourth, and/or fifth aspect of the present invention. The first and second sets of transducers are preferably permanently installed on the structure. The transducers may be ultrasonic transducers.

Preferably, the first mode of operation is pulse-echo and the second mode of operation is pitch-catch.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

Introduction

Figure 1:
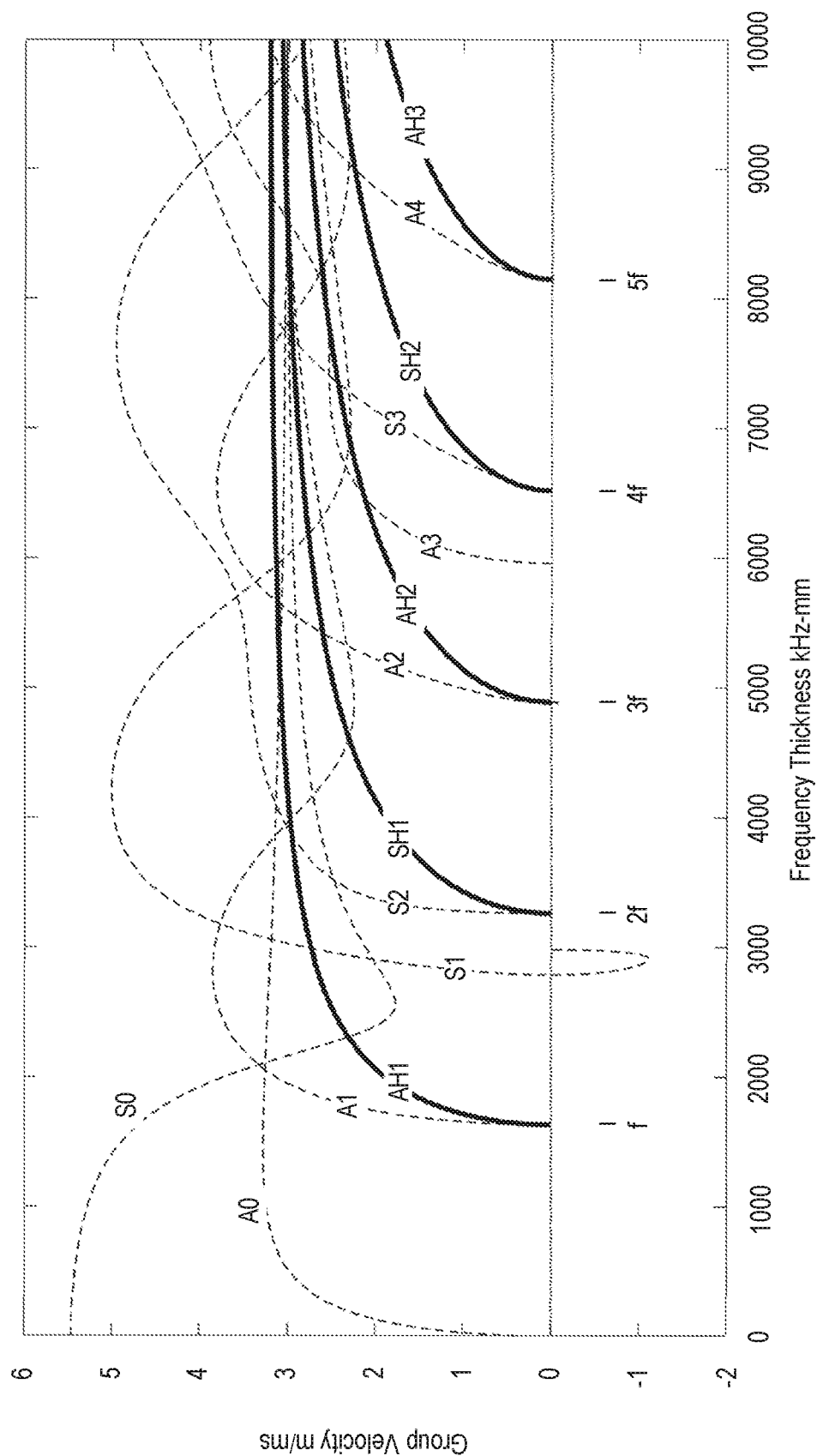
FIG. 1 shows dispersion curves for a set of guided waves in a plate.

FIG. 1 illustrates dispersion curves of a set of guided wave modes which can be excited in a plate (not shown). The dispersion curves may be used as a good approximation for dispersion curves for the guided wave modes propagating on a curved plate of the same thickness if the curvature is large compared to the wall thickness (for example, a 168 mm diameter pipe with a wall thickness of 7 mm).

The guided wave modes propagating between the transducers of the guided wave system for pipe inspection described herein are one such example. Therefore, even though in the following pipes are discussed, reference is made herein to shear horizontal, symmetric and antisymmetric modes, which are plate guided wave modes. The structure need not be a pipe, but can take other forms of elongate or extended structure, such as plates, rails, beams, pillars and the like.

In FIG. 1, the guided wave modes (shown in continuous, bold lines) are symmetric and antisymmetric shear horizontal modes. However, the following discussion is not limited to shear horizontal modes. Other dispersive guided wave modes may be used, such as symmetric or antisymmetric Lamb wave modes (shown in dashed lines).

Referring to FIG. 1, each guided wave mode shown (shown in continuous bold lines) has a respective cut-off (through-thickness resonance) frequency starting from a first mode with a cut-off frequency, f, followed by a series of cut-off frequencies for higher-order modes spaced apart by the frequency, f. The frequency depends on the thickness of a wall of the pipe. In particular, the frequency decreases as the pipe wall thickness increases.

Some of the methods of determining a thickness of a wall of an elongate or extended structure herein described involve, in a pitch-catch configuration, exciting at least two guided wave modes regardless of the thickness of the pipe, measuring a response which includes contributions from multiple guided wave modes and using the response to determine the thickness of the pipe wall. Thickness determination can use the fact the spacing of features attributable to two different modes depends on the thickness of the pipe wall and/or employ a set of thickness-dependent references to find a matching reference and, thus, determine the thickness of the pipe wall (using a process which is herein referred to as "masking").

Excitation of at least two guided wave modes is achieved by choosing an excitation that has a sufficiently wide bandwidth for a range of expected pipe wall thicknesses (for example, 5 to 25 mm). Thus, the same broadband excitation can be used for different pipes.

Figure 2:
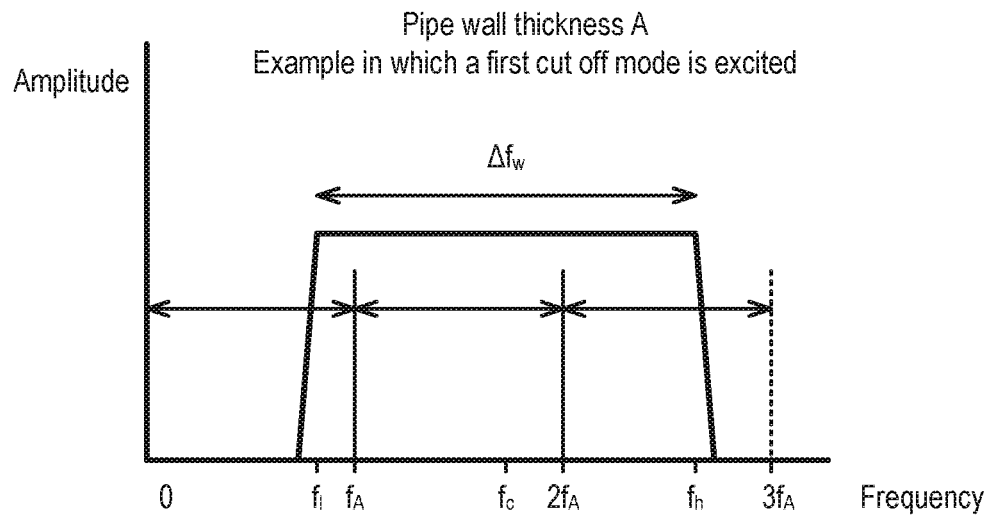
FIG. 2 schematically illustrates a broadband excitation having a bandwidth $\Delta f_w$ which can be used to excite a set of shear horizontal guided wave modes in a pipe of a first wall thickness including a first cut-off mode.
Figure 3:
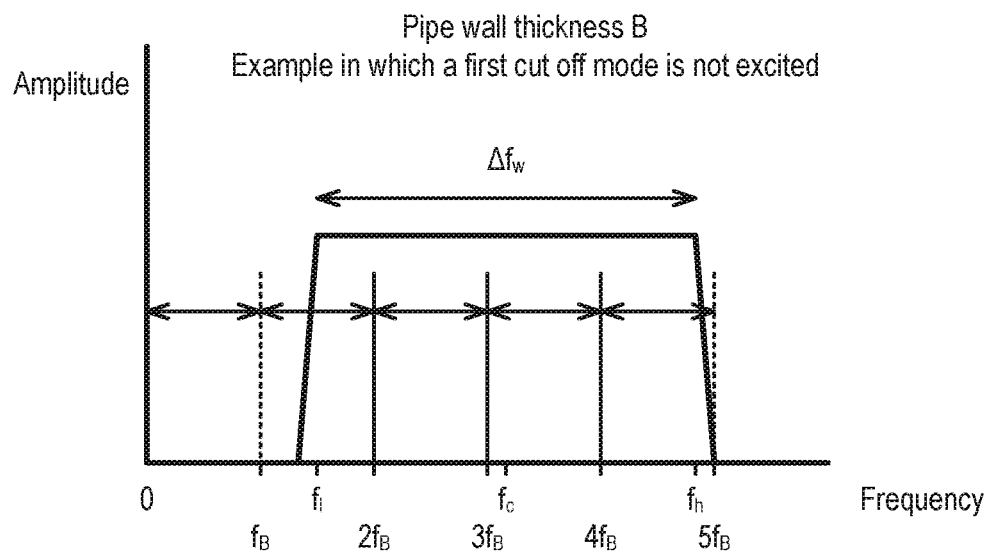
FIG. 3 schematically illustrates a broadband excitation having a bandwidth $\Delta f_w$ which can be used to excite a set of shear horizontal guided wave modes in a pipe of a second wall thickness excluding a first cut-off mode.

Referring to FIGS. 2 and 3, provided the bandwidth, $\Delta f_w$, of the broadband excitation is greater than twice the first cut-off frequency, f, then at least two guided wave modes should be excited. In some cases, the first cut-off mode is excited (as illustrated, for example, in FIG. 2). In other cases, the first cut-off mode falls outside of the excitation range (as illustrated, for example, in FIG. 3). Nevertheless, even when the first cut-off mode falls outside of the excitation range, thickness determination is still possible.

Referring in particular to FIG. 3, for at least two modes to fall within an excitation range, $\Delta f_w$, the following criterion should be satisfied, $\Delta f_w > 2f$, where f is the frequency of the first cut off frequency, $f_b$. This criterion defines a minimum thickness, but not a maximum thickness that can be measured with this method. In practice, however, other factors, such as frequency bin size, can place a limit on maximum thickness.

The wall or plate thickness, t, is related to shear speed, $C_s$, (which depends on material and temperature) and the first cut-off frequency, f:

$$f = C_s/(2 \times t) \tag{1}$$

Thus, the sufficiently broad frequency range can be determined using:

$$\Delta f_w > \frac{C_s}{\text{wall thickness}} \tag{2}$$

For example, a 10 mm steel wall, assuming $C_s$=3250 m/s, $\Delta f_w$ needs to be at least 325 kHz to guarantee capturing at least two modes.

If processing is extended to include all modes with a cut off rather than only shear horizontal modes, then the criterion becomes $$\Delta f_w > \frac{C_l}{C_s} f_b,$$

where $C_l$ is the longitudinal speed. In this case the sufficiently broad frequency range can be determined using:

$$\Delta f_w > \frac{C_l}{2 * \text{wall thickness}} \tag{3}$$

A broadband excitation can be achieved in a number of different ways. For example, a single broadband excitation signal, for instance, in the form of a chirp can be used.

Figure 4:
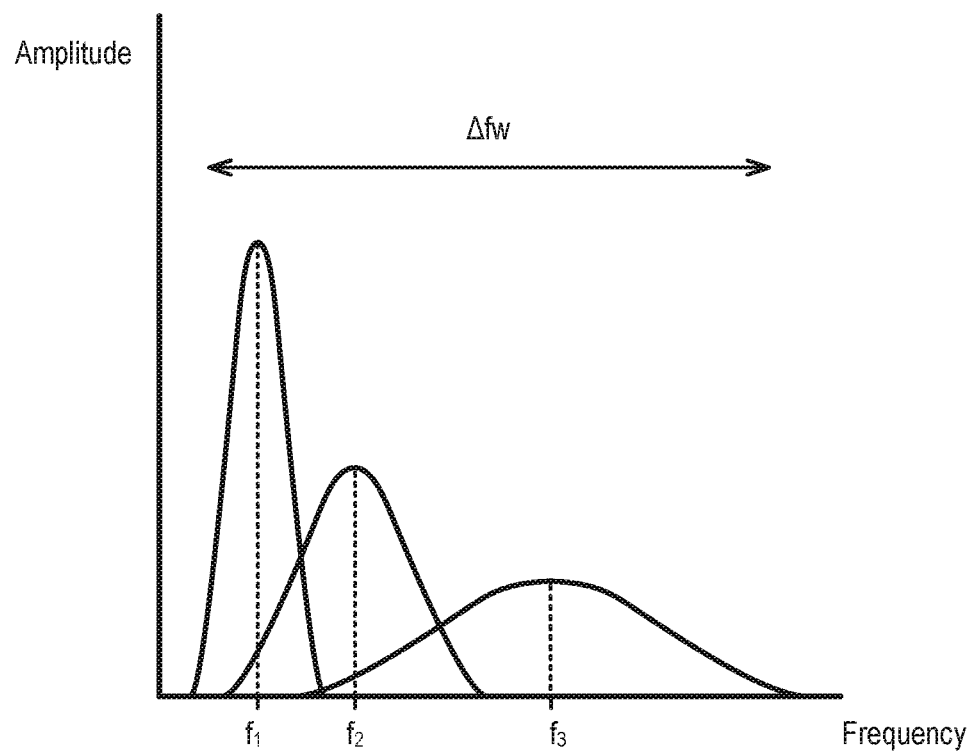
FIG. 4 schematically illustrates synthesis of a broadband excitation having a bandwidth $\Delta f_w$ using three, different narrowband excitations.

Referring to FIG. 4, another way to obtain a broadband excitation is to use at least two, separate excitation signals, each excitation having a respective frequency range, where the frequency range of each excitation overlaps with that of a neighbouring excitation.

Figure 5:
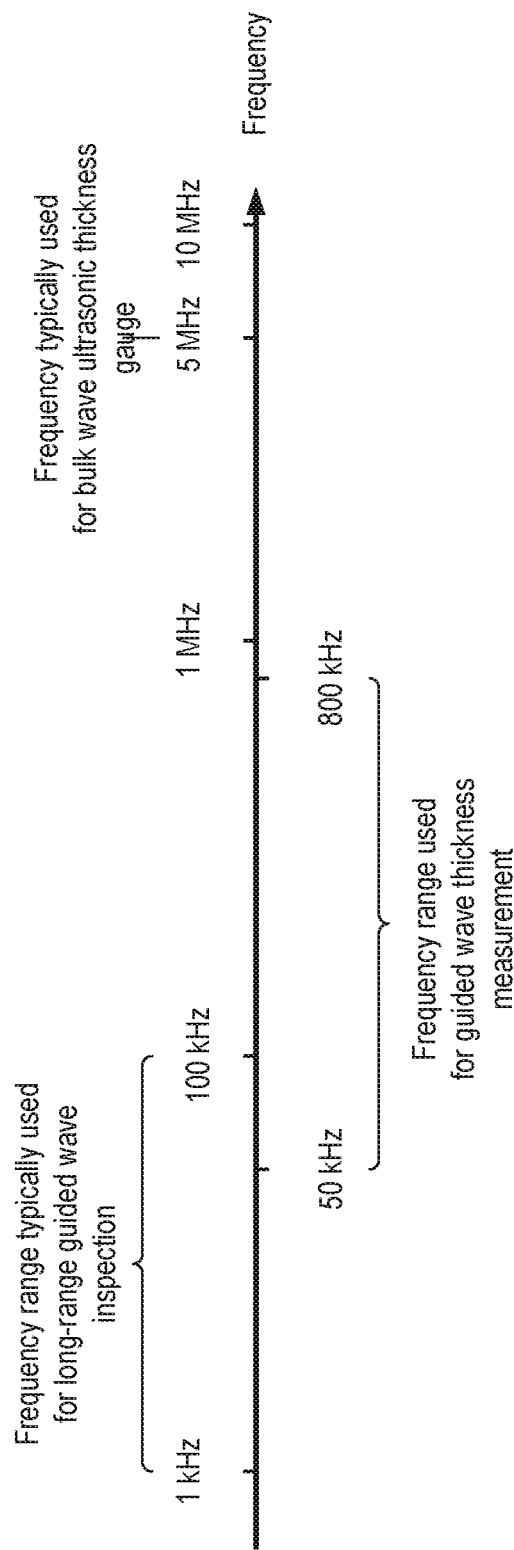
FIG. 5 illustrates a frequency range used for broadband excitation with a frequency range typically used for guided wave inspection.

Referring to FIG. 5, an inspection ring having two rows of transducers or two inspection rings each having a row of transducers can be used to measure pipe wall thickness using methods herein described. The inspection ring(s) can be used for long range guided wave pipe inspection using torsional-mode guided waves having frequencies falling in a range between 1 kHz and 100 kHz. Other modes, such as longitudinal or flexural modes can be used. More than one different mode can be used. As will be explained in more detail hereinafter, thickness determination methods can use waves having frequencies falling in a range between 50 kHz and 800 kHz.

Masking

A masking process is used to "pick" the thickness of the wall employing multiple modes to measure pipe wall thickness. The process is not reliant on any particular mode and can have one or more advantages including increased robustness to noise, optimised resolution (regardless of wall thickness) and the potential for resolution to be finer than the frequency step of the size of the result signal.

Figure 6:
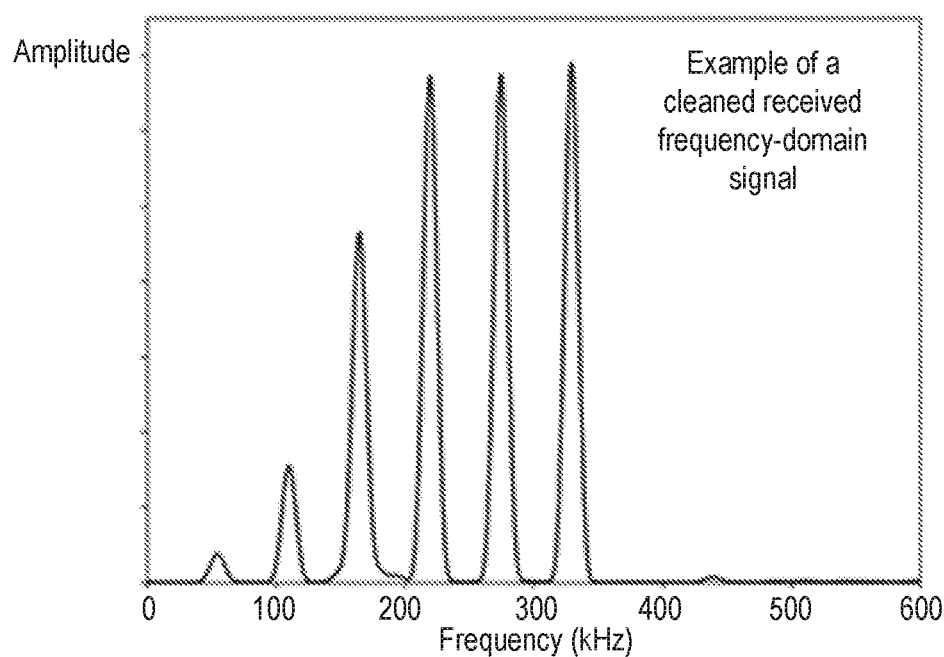
FIG. 6 illustrates an example of a de-noised frequency-domain signal.
Figure 7:
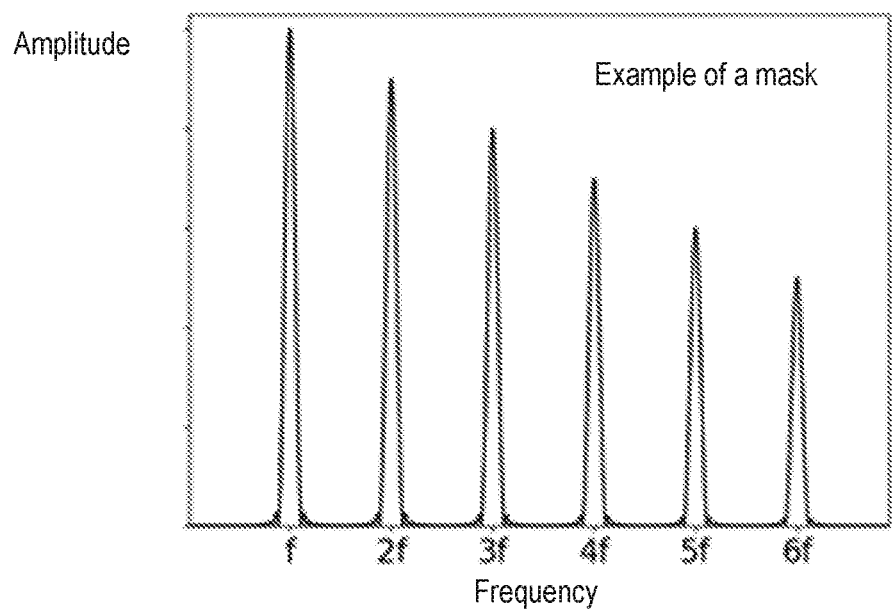
FIG. 7 illustrates an example of a frequency-domain mask which can be used to search for guided wave modes in a de-noised frequency-domain signal and so find a thickness of a wall of a pipe.

Referring to FIGS. 6 and 7, the masking process takes a de-noised, broadband frequency-domain signal (for example one obtained by combining two or more frequency-domain signals into a single frequency-domain signal which is then filtered) and returns a thickness value.

The thickness of the pipe is determined by comparing the combined, de-noised frequency domain signal with a set of masks. A mask is an artificially-generated signal such as that shown in FIG. 7. A mask is built for a range of frequencies, f, (i.e., the frequency hereinbefore described) in the specified search range. Each mask is built to be the same length, i.e., NFFT, as the real signal. In other words, the mask is built in the time domain with the same time step (which is the inverse of sampling rate between samples), dt, as the real data. This ensures that frequency step is the same for the masks as it is in the real data. This can make operations, such as multiplication of the mask with the real data, simpler, easier and more meaningful. Expressed differently, the real data and the mask share a single frequency axis.

Each mask forms a row in a matrix, M, of all masks. By multiplying M with a column vector containing the real signal, P, a vector, C, is obtained which describes how closely each mask matches with the real signal and the length of C will be equal to the number of masks (rows) in M.

$$C=MP \quad (4)$$

The index of the maximum value in C can be cross-checked against the value of f used to create the corresponding mask. Frequency f can be used to calculate the thickness if a value for shear speed is known.

To make the process more efficient but maintain the desired resolution, initially the process runs with a coarse step size of f. The best matching value of f is then used as the median of a range of more finely-spaced masks. The process is repeated until the resolution meets a pre-specified threshold.

The exemplary mask shown in FIG. 7 is constructed to search only for shear horizontal modes, but other masks can be constructed to search for other guided wave modes.

The use of a masking method for picking a frequency allows the use of multiple modes to size the wall. This can have several benefits. First, there is no reliance on any single mode. For example, if the AH1 mode falls below the excitation range, then the wall can still be correctly sized using the higher-order modes. The more modes that can be used, the more robust to noise the measurement becomes.

Resolution can be defined as being the minimum change in wall thickness that can be detected between measurements. The bin size on the frequency axis is the most important factor determining resolution. Referring to FIG. 6, consider the situation that the frequency step size is 500 Hz and the wall thickness is 27 mm. If just the AH1 mode is used, then a peak would be expected at 60.2 kHz. A change is only seen when this value becomes 60.7 kHz, which corresponds to thickness of 26.77 mm and, thus, resulting in a resolution of 0.23 mm. However, by using multiple modes, it is possible to exploit the greater resolution available at higher frequencies. For the signal shown in FIG. 6, the process would be sensitive to changes on the highest frequency mode shown which would correspond to a resolution of 0.04 mm. This would be the resolution if using only a simple peak-picking method. However, another benefit of the masking method is that it can be sensitive to changes that are smaller than the frequency bin size.

To illustrate this, consider the situation that the bin size is 500 Hz and a signal that has a centre frequency falling somewhere between 100 kHz and 100.5 kHz. A number of masks can be built with centre frequencies ranging between 100 kHz and 100.5 kHz. Whilst both the mask and the result will have a peak at either 100 or 100.5 kHz, a much better estimate of centre frequency can be obtained from the best matching vector C.

Using multiple modes can help to reduce the amount of computation used to determine the thickness of the wall. If, however, a single mode is used, then zero padding can be added before transforming from time to frequency domain to improve resolution, although this can increase computational overheads.

Using multiple modes also takes advantage of the fact that the thickness of the pipe is encoded in the spacing between the modes. Using a single mode does not exploit this. Moreover, in an automated set up, it would be difficult to measure the thickness without prior knowledge of the approximate thickness of the wall or making assumptions.

If a measurement is reliant on a specific mode, then it is necessary to ensure that the mode falls within the excitation range. There may be two issues with this. First, unless using an extremely wideband excitation, it may be necessary to change the excitation settings from pipe to pipe which increases complexity. Secondly, the transduction system should have an acceptable frequency response. For example, external factors (such as transducer body resonances) might introduce unwanted resonances in the frequency range of interest.

In some embodiments, thickness determination can be carried out by a narrow range of excitation frequency in the range 100 kHz to 800 kHz, chosen based on a nominal thickness. Thus, a specific mode is excited and a resonance peak in the response in a range 100 kHz to 800 kHz can be used to determine the thickness of the structure using a narrower frequency range containing only one cut-off frequency.

Inspection System 1

Figure 8:
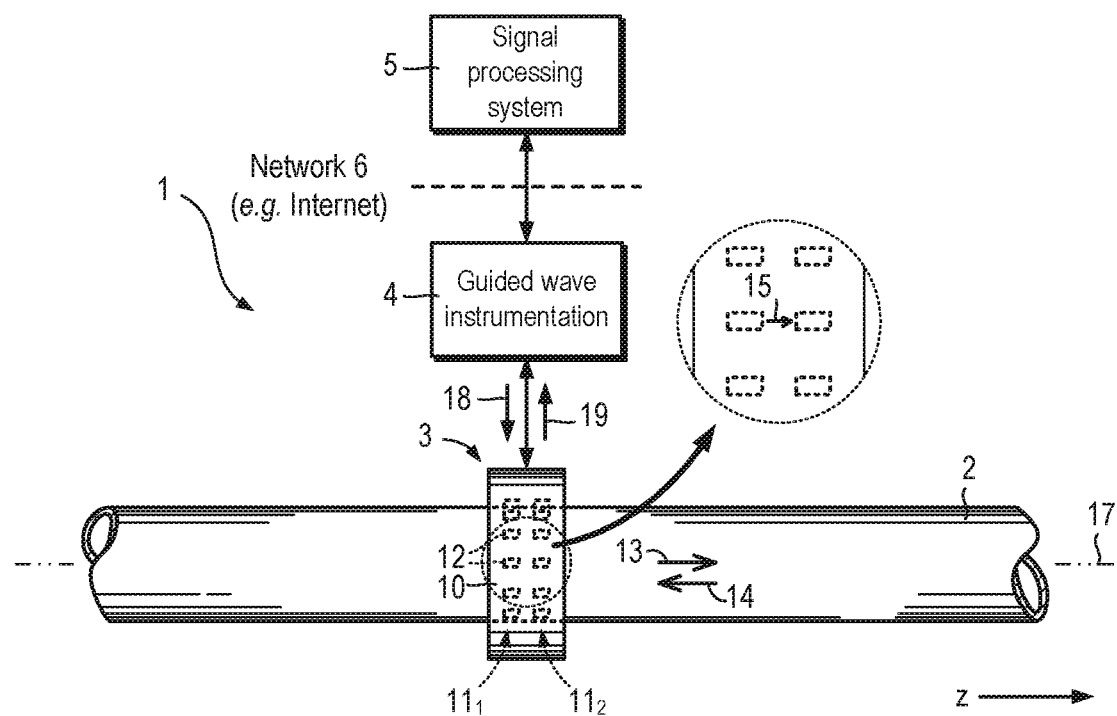
FIG. 8 is schematic diagram of a pipe and a guided wave testing system which includes a transducer assembly, guided wave instrumentation and a computer system.
Figure 9:
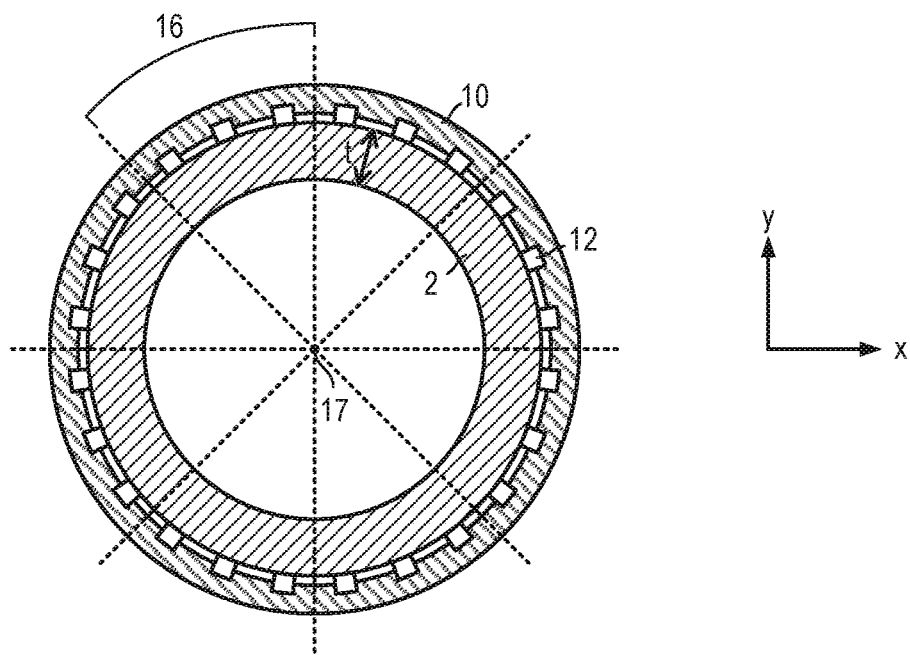
FIG. 9 is a transverse cross section through the pipe and transducer assembly shown in FIG. 8.
Figure 10:
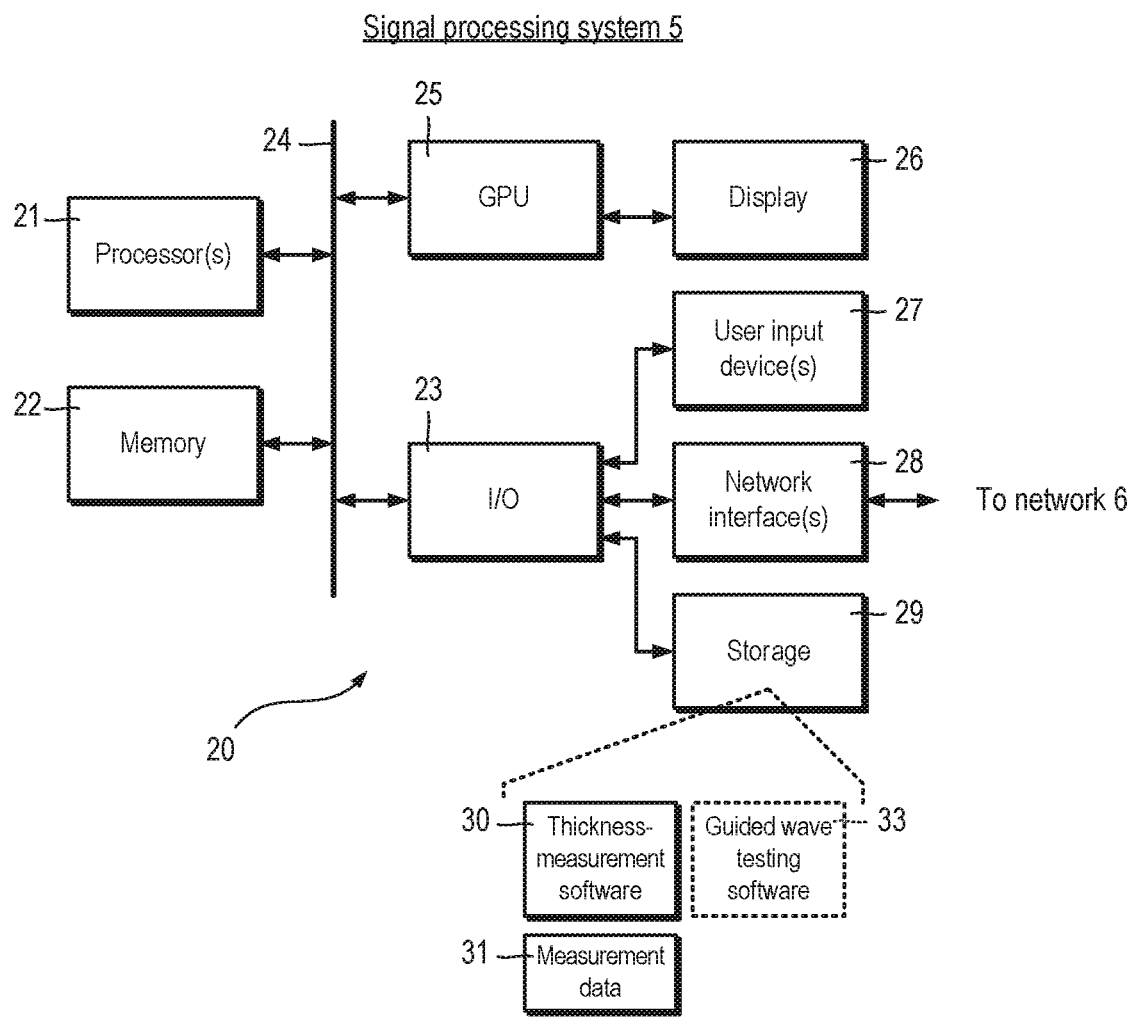
FIG. 10 is a schematic block diagram of the computer system shown in FIG. 8.

Referring to FIGS. 8 to 10, a system 1 for inspecting a pipe 2 or other similar structure using guided waves is shown. The inspection system 1 includes a transducer assembly 3 (or "inspection ring") which is permanently or removably attachable to the pipe 2, guided wave instrumentation 4, and a signal processing system 5.

The inspection ring 3 comprises a band 10 (or "collar") which supports first and second arrays $11_1$, $11_2$ of transducers 12 for generating guided waves 13 in the pipe 2 and detecting waves 14 reflected from defects or features (not shown). As will be explained in more detail hereinafter, certain dispersive ultrasonic waves 15 (herein also referred to as "ultrasonic wave modes" or simply "modes") can be generated by transducers 12 in the first array $11_1$ and detected by transducers 12 in the second array $11_2$ which can be used to measure the thickness, t, of the wall of the pipe 2. The transducers 12 preferably take the form piezoelectric transducers and an example of suitable transducers can be found in GB 2 479 744 A which is incorporated herein by reference. Each array $11_1$, $11_2$ may comprise, for example, 16 or 32 transducers 12, although there may be fewer than 16, between 16 and 32 or more than 32 transducers 12. The transducers 12 are grouped into sectors 16 (or "channels"), for example, eight sectors 16, each sector 16 consisting of between 2 to 9 or more transducers 12.

Each array $11_1$, $11_2$ are arranged such that, when the inspection ring 3 is installed, the transducers 12 are disposed around the periphery of the pipe 2. The first and second arrays $11_1$, $11_2$ are offset across the width of the band 10 such that, when the inspection ring 3 is installed, the two arrays $11_1$, $11_2$ are offset along a longitudinal axis 17 of the pipe 2. An example of a suitable inspection ring is the gPIMS® ring available from Guided Ultrasonics Ltd. (London, UK). Two separate rings 3, each having only a single array of transducers, can also be used.

The guided wave instrumentation 4 includes a signal generator (not shown) capable of generating rf signals 18 having a suitable frequency, which is usually of the order hundreds of kilohertz (kHz), and a suitable shape, such as, for example, a k-cycle suitably-windowed tone burst or a chirp signal, where k is a positive number equal to or greater than 1, preferably an integer or half integer, preferably taking a value in the range $3 \leq k \leq 10$, and where a suitable windowing function can be a Gaussian function. The signal generator (not shown) feeds the rf signal 18 to a transmitter transducer 12 which converts the signal 18 into a guided wave in the pipe wall 2.

The receiver transducer 12 converts a received guided wave into an electrical signal 19. The receiver transducer 12 feeds the electrical signal 19 to a signal receiver (not shown). The signal receiver (not shown) may include an amplifier (not shown) and an analogue-to-digital converter (not shown) which generates a digitized signal of the electrical signal 19.

The guided wave instrumentation 4 excites transducers 12 in the first array $11_1$ and receives signals from transducers in the second arrays $11_2$ respectively in pitch-catch mode. The guided wave instrumentation 4 can excite transducers 12 in a sector 16 in the first array $11_1$ and receives signals from corresponding transducers 12 in the corresponding sector 16 in the second array $11_2$. The guided wave instrumentation 4 can excite all transducers 12 in the first array 11, and sample, in sequence, transducers 12 in the second array $11_2$. This can be employed with multiplexing and can be used to help simplify operation.

The guided wave instrumentation 4 and signal processing system 5 may be integrated into a single unit. The signal processing system 5 may take the form of a lap-top, tablet or other form of portable computer having one or more CPUs and, optionally, one or more GPUs. The signal processing system 5 may be remotely located, e.g., in a server farm, connected to the rest of the system via a communications network 6 which may include, for example, the Internet, or a local connection (e.g. USB). Examples of suitable guided wave instrumentation include G4 Mini (Full), Wavemaker G4, gPIMS Mini Collector and other instruments available from Guided Ultrasonics Ltd. (London, UK).

Referring also to FIG. 10, the signal processing system 5 is implemented by a computer system 20 which comprises at least one processor 21, memory 22 and an input/output module 23 interconnected by a bus system 24. The system 20 may include a graphics processing unit 25 and a display 26. The system 20 may include user input device(s) 27 such as keyboard (not shown) and pointing device (not shown), a network interface 28 and storage 29 for example in the form of hard-disk drive(s) and/or solid-state drive. The storage 29 stores thickness-measurement software 30, measurement data 31. If the guided wave instrumentation 4 and signal processing system 5 are co-located (e.g., the signal processing system 5 takes the form of a lap-top computer connected directly to the instrumentation 4) or integrated into a single unit, then the computer system 20 may be used for controlling guided wave instrumentation 4 and so the storage 20 may include guided wave testing software 33.

Thickness measurement may be implemented by the guided wave instrumentation 4.

Referring in particular to FIGS. 8 and 9, the system 1 may be used to inspect the pipe 2 to detect and/or to monitor development of cracks, corrosion and other defects (not shown) in the pipe 2 using long-range guided waves 13, 14 in pulse-echo mode. The system 1 may also be used to measure a thickness, t, of the wall of a pipe 2 using through-thickness resonance using guides waves 15 in pitch-catch mode.

Measuring Pipe Wall Thickness—Introduction

Referring to FIGS. 8, 9, 11 and 12, transducer(s) 12 ("a transmit transducer(s)") in the first array $11_1$ is (are) used to excite a sequence of guided waves 15, preferably shear horizontal wave modes 15, at different frequencies in the pipe wall 2, and transducer(s) 12 ("receive transducer(s)") in the second array $11_2$ is (are) used to detect the ultrasonic waves 15. The transducer(s) 12 is excited by a series of excitation signals having centre frequencies, $f_1$, $f_2$, $f_3$, where $f_3 > f_2 > f_1$. $f_1$ is 110 kHz, $f_2$ is 220 kHz and $f_3$ is 440 kHz. Other centre frequencies, however, can be used. The second and third centre frequencies $f_2$, $f_3$, need not be multiples of the first centre frequency $f_1$.

Figure 11:
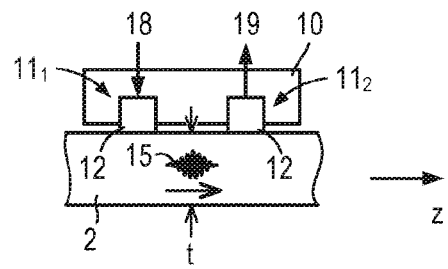
FIG. 11 illustrates propagation of a guided wave for a thickness measurement in a wall of a pipe.
Figure 12:
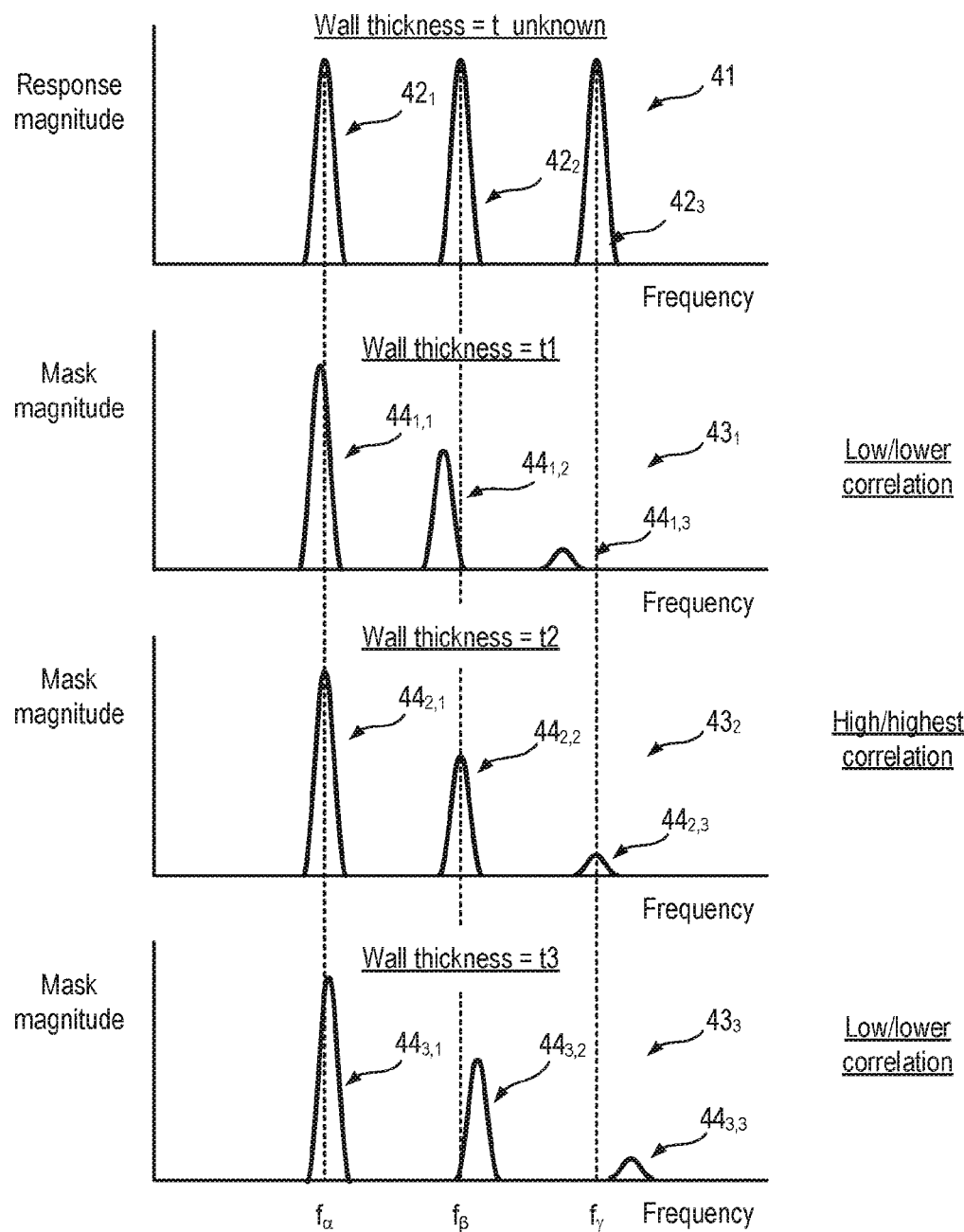
FIG. 12 schematically illustrates determining a thickness of a wall of a pipe by comparing a frequency-domain response for a pipe of unknown wall thickness to reference frequency-domain responses for pipes of known wall thicknesses.

Referring in particular to FIGS. 11 and 12, each time-domain response 19 generated by the receive transducer(s) 12 resulting from a respective excitation signal 18 at a given frequency (e.g., $f_1$) is processed and, optionally, combined with other processed responses resulting from excitation signal 18 at one or more other frequencies (e.g., $f_2$, $f_3$) to provide a frequency-domain response 41.

The time-domain responses 19 are preferably transformed into respective frequency-domain responses before they are combined (or "merged"). Coherent and incoherent noise is reduced, e.g., removed, from the frequency-domain responses and/or the combined frequency-domain response to obtain a cleaner (i.e., less noisy) frequency-domain response. Coherent noise such as transient signals and incoherent noise can be reduced by performing Welch's method, by single-spectrum analysis or by another suitable method of reducing coherent and incoherent noise on a frequency-domain signal.

The frequency-domain response 41 can include one or more characteristic features $42_1$, $42_2$, $42_3$ (for example, a peak) corresponding to modes 15 generated in the pipe 2. In the example shown in FIG. 12, there are three characteristic features $42_1$, $42_2$, $42_3$ lying at first, second and third frequencies $f_\alpha$, $f_\beta$, $f_\gamma$ respectively. In this case, the characteristic features $42_1$, $42_2$, $42_3$ are generally equally-spaced in frequency and correspond to three shear horizontal modes. Although three characteristic features $42_1$, $42_2$, $42_3$ are shown, the number of characteristic features $42_1$, $42_2$, $42_3$ do not need to be the same as the number of excitation signals. Fewer or more modes and, thus, characteristic features, may be generated by the excitation signals 17. The characteristic features can have different amplitudes and can have different relative positions is depending on, for example, the type of modes. In particular, if there are different modes, then the characteristic features $42_1$, $42_2$, $42_3$ need not be equally spaced.

Figure 13:
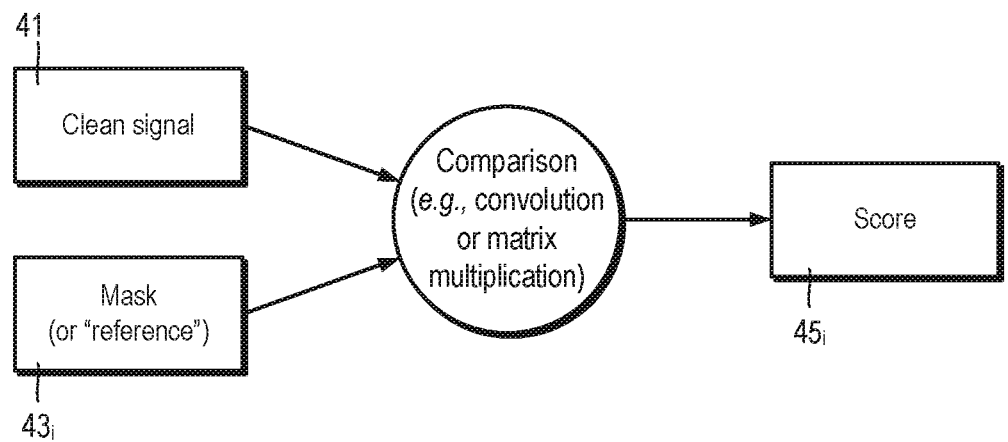
FIG. 13 illustrates comparing a frequency-domain response for a pipe of unknown wall thickness to a frequency-domain response (or "mask") for a pipe of known wall thicknesses.
Figure 14:
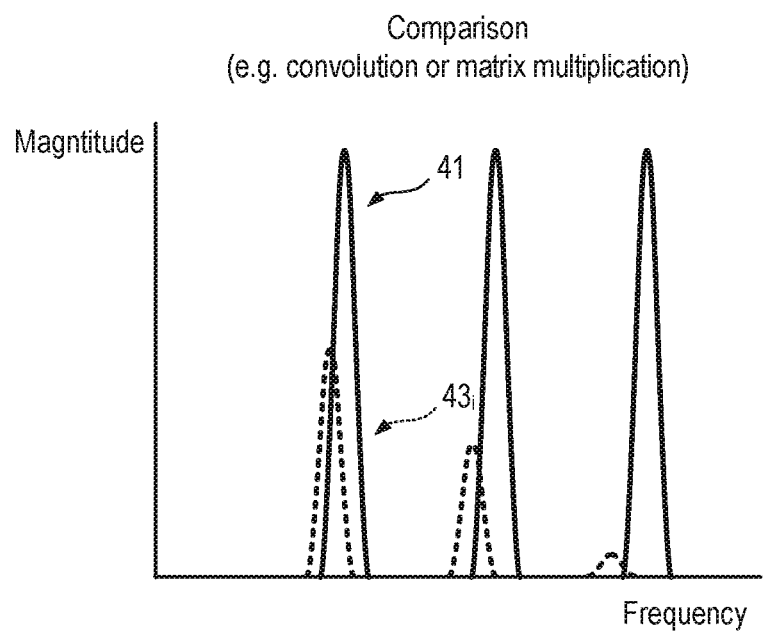
FIG. 14 shows plots of a frequency-domain response for a pipe of unknown wall thickness with a frequency-domain response for a pipe of known wall thicknesses.
Figure 15:
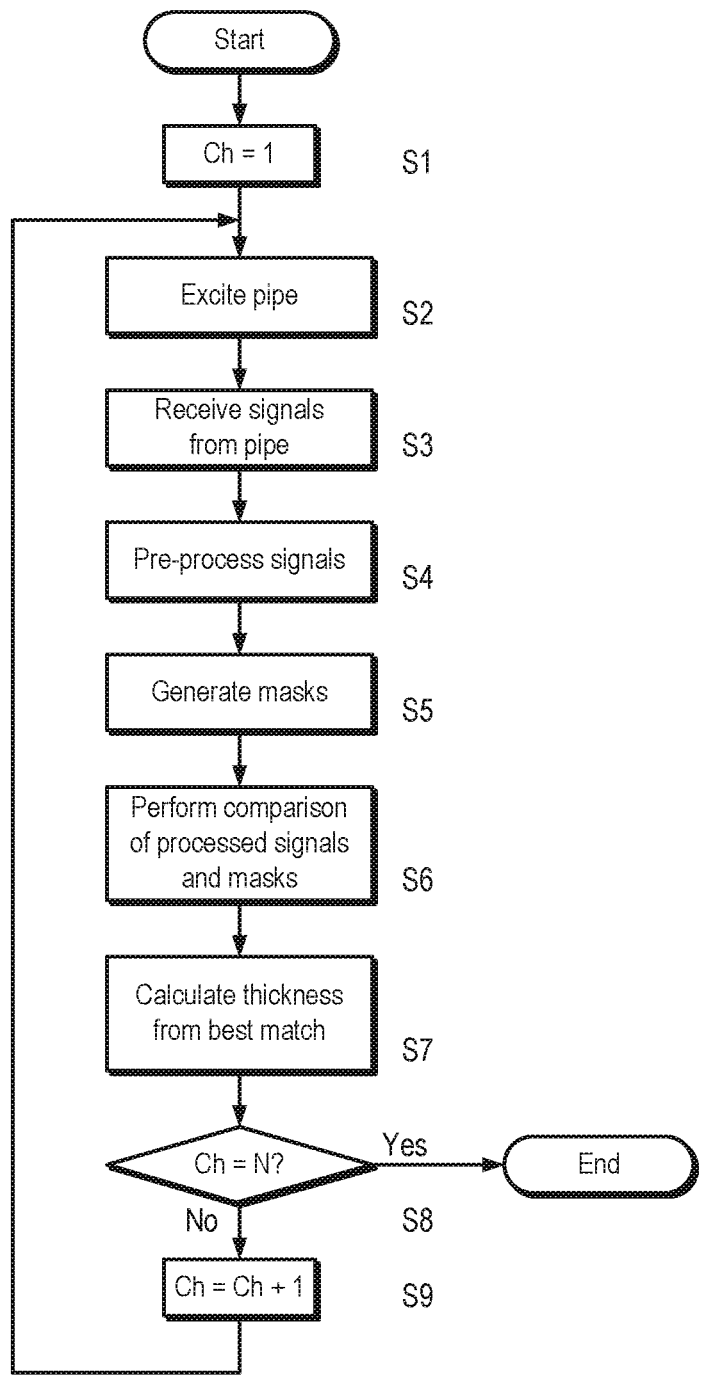
FIG. 15 is a process flow diagram of a method of determining a thickness of a wall of a pipe.
Figure 16:
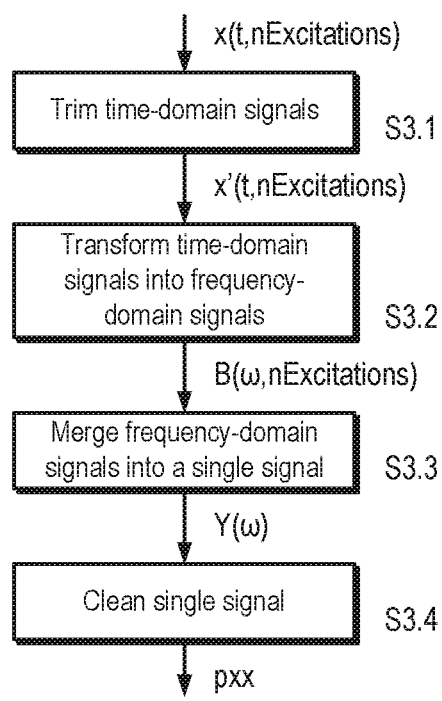
FIG. 16 is a process flow diagram of a method of pre-processing a set of time-domain signals into a single, de-noised frequency-domain signal for comparison with other frequency-domain signals.

Referring also to FIGS. 13 and 14, the response 41 is compared (e.g., by convolution or using equation (4) above) with a set of one or more mask signals $43_i$ (or "masks" or "reference frequency-domain signals") where i=1, 2, ..., m, each mask $43_i$ corresponding to a frequency-domain signal for a pipe wall 2 of a given thickness, to obtain a respective score $45_i$. The masks $43_i$ may be generated (e.g., simulated) or measured. Each mask $43_i$ includes one or more characteristic features $44_{i,j}$ where j=1, 2, . . . , p. Each mask $43_i$ preferably contains the same number of characteristic features as the frequency-domain response 41.

The mask signals $43_i$ do not necessarily need to be replicas of the expected signals. In particular, mask amplitudes do not need to be the expected or measured amplitudes. However, mask amplitudes are preferably used which can help to maximise probability of a correct measurement.

If the positions of the characteristic features for the response 41 and the mask $43_i$ are closer, then the corresponding score $45_i$ is higher. The thickness of pipe wall 2 is chosen to be the thickness of the mask $43_i$ resulting in the highest score $45_i$.

Measuring Pipe Wall Thickness—Process

Referring to FIGS. 8 to 10, and FIGS. 15 to 20, a method of determining a thickness of a wall of a pipe using ultrasonic waves will now be described in more detail. The method is performed by the processor(s) 21 under the control of thickness-measurement software 30. For clarity, the process is described using only one processor 21. A measurement of local thickness is carried out for each sector of the pipe (i.e., each part of the circumference of the pipe) and so provide several measurements of thickness around the circumference of the pipe (as opposed to one, for example, averaged value obtained for the pipe wall at the location of the ring).

Figure 17A:
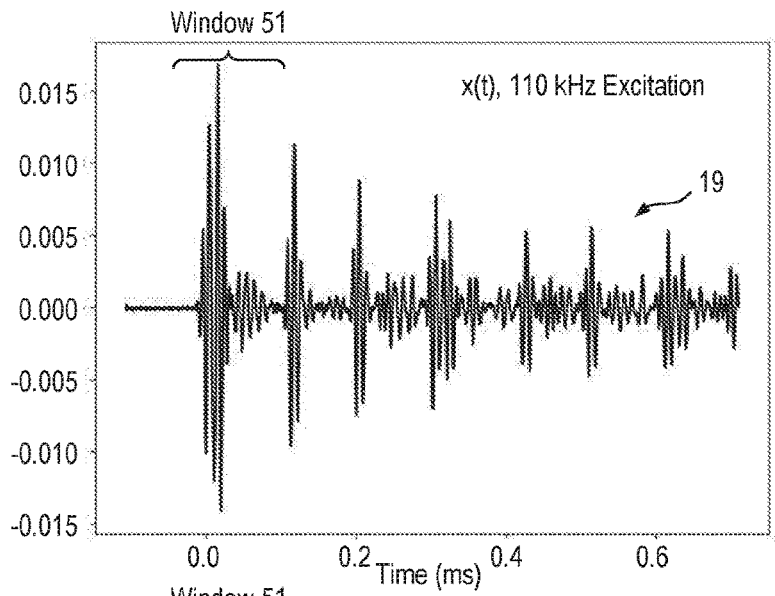
FIGS. 17a, 17b and 17c show first, second and third time-domain response signals.
Figure 17B:
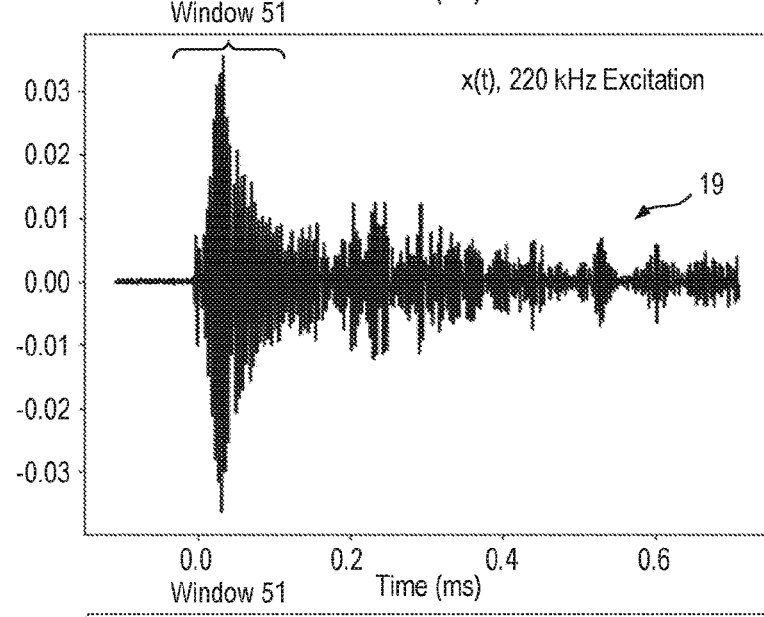
Figure 17C:
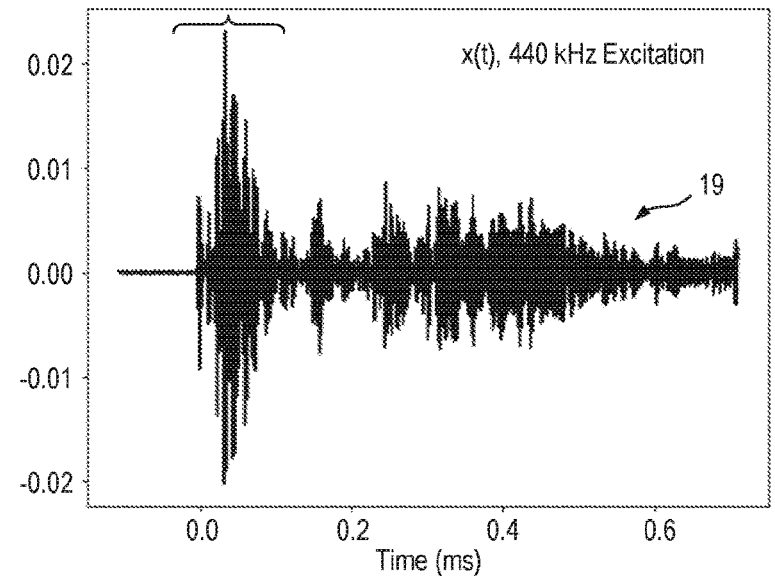
Figure 18A:
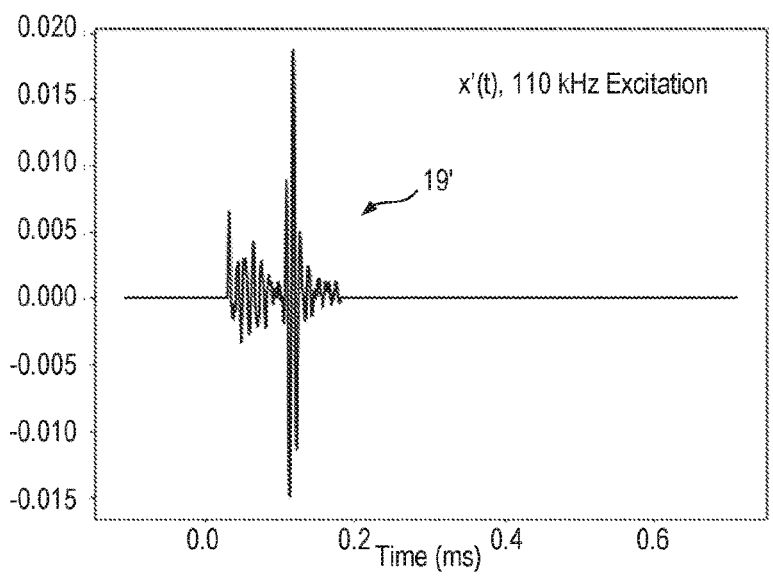
FIGS. 18a, 18b and 18c show first, second and third windowed, time-domain response signals.
Figure 18B:
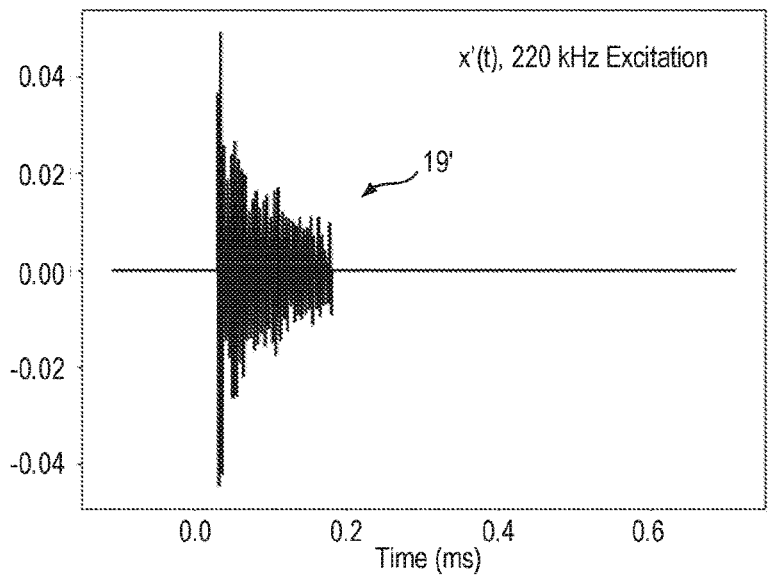
Figure 18C:
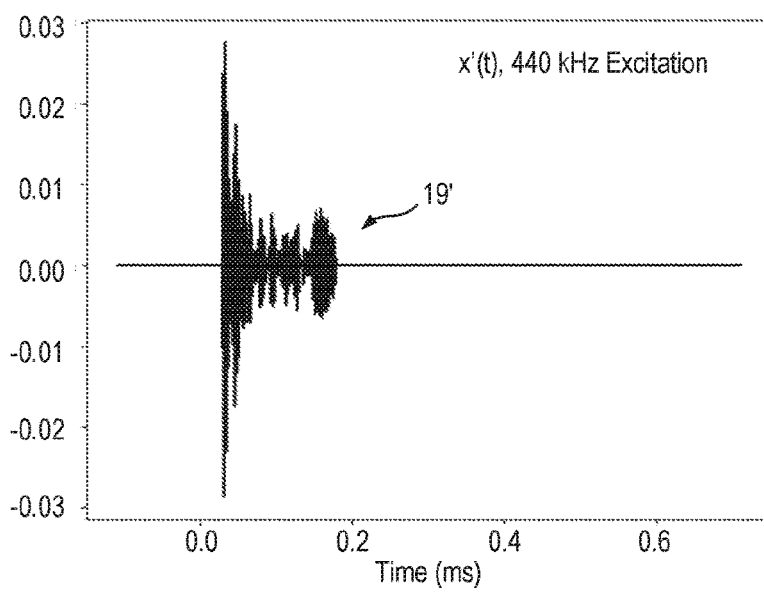

For each channel, starting with a first channel, i.e., a set of transducers 12 in a given sector 16 (step S1), the signal processing unit 5 receives a file which includes a set of time-domain responses 19 (or "signals") (step S2). FIGS. 17a, 17b and 17c show examples of measured time-domain responses 19 resulting from excitation signals at 110 kHz, 220 kHz and 440 kHz respectively.

The Processor 21 Processes the Signals 19 (Step S3).

Figure 19:
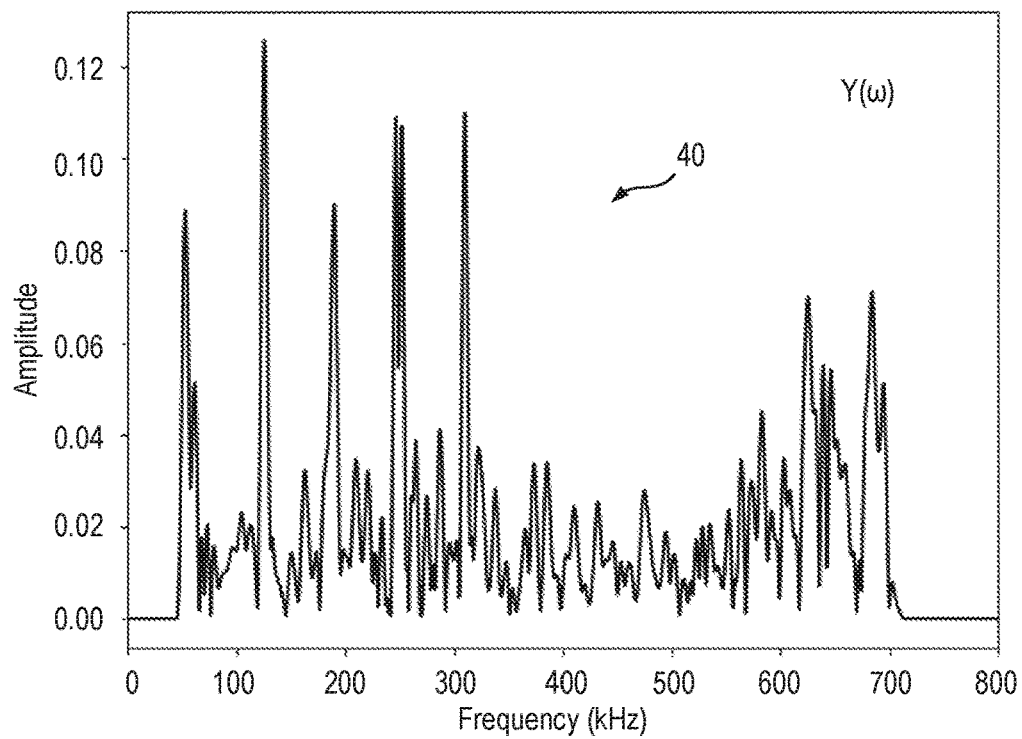
FIG. 19 shows a frequency-domain signal following combination and transformation of time-domain signals into the frequency domain.
Figure 20:
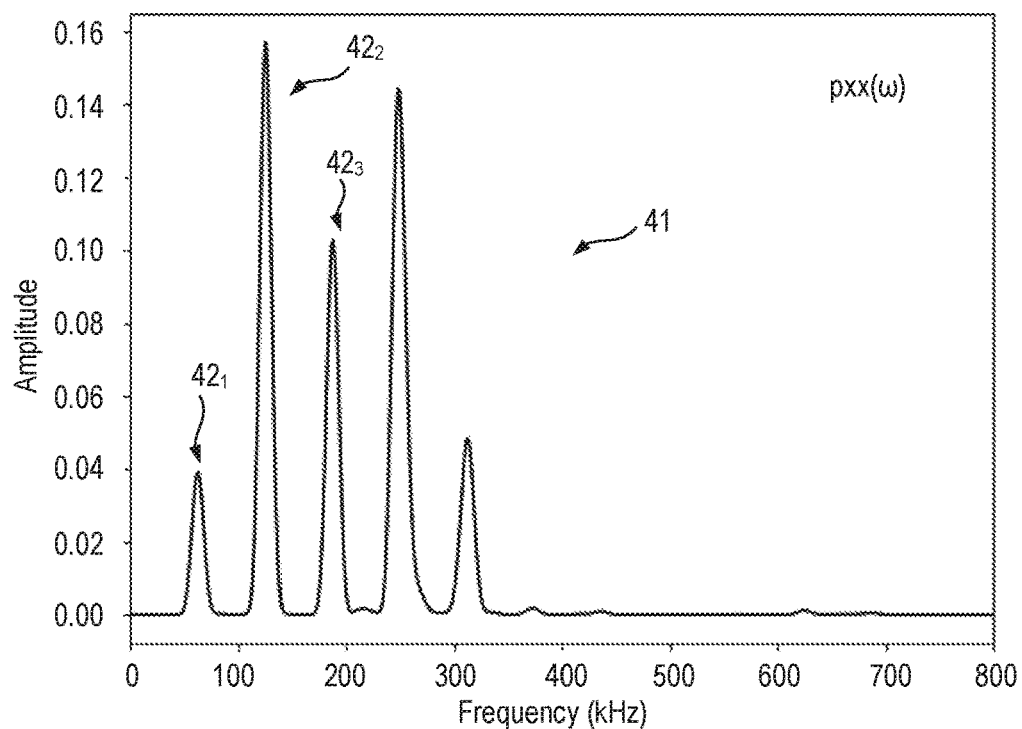
FIG. 20 shows a de-noised frequency-domain signal following processing using Welch's method.

The processor 21 trims each time-domain response 19 by performing windowing, i.e., extracting a portion of the response 19 in a given time window 51 (step S3.1). FIGS. 17a, 17b and 17c show examples of the measured time-domain responses 19' after windowing. The processor 21 transforms each time-domain response 19' into a frequency-domain response (step S3.2). The processor 21 combines the frequency-domain responses into a single combined (or "merged") frequency-domain response (step S3.3). FIG. 19 show an example of a frequency-domain response 40. The processor 21 then cleans (i.e., de-noises) the merged frequency-domain response (step S3.4). FIG. 20 show an example of a frequency-domain response 41.

The processor 21 then looks for the best-matching mask so as to determine the thickness of the pipe wall (step S6).

The processor 21 can use a seed value of thickness (herein referred to simply as a "seed") to help reduce processing time and/or increase reliability (by reducing the probability of an incorrect selection).

The processor 21 searches for the best-matching thickness across a wide range (or "default range") of thicknesses based on the excitation frequencies used. The default range may be 5 mm to 25 mm. The default range may be determined to be the range of thicknesses in which at least two target modes fall in the frequency range being excited in the pipe.

The search range may be reduced. For instance, taking a seed of 8 mm as an example, the processor 21 searches for a thickness between 7 mm and 9 mm.

By default, a previously-measured thickness for a specific channel (i.e., a specific transducer 12) of a given guided wave instrumentation 4 (FIG. 8) may be used as the seed for a subsequent measurement. Thus, a first thickness measurement for a specific channel for the guided wave instrumentation 4 (FIG. 8) is unseeded. A user-defined seed can be supplied either to override a default seed or supply a seed when one is unavailable. Conversely, a seed can be overridden to force a full range test even if seeds are available.

The processor 21 determines whether it has a set of masks in the search and if a mask for a given thickness in the range does not exist, then the processor 21 can create one (step S5).

The processor 21 then determines the best matching mask (step S6).

If a mask is found and the thickness of the pipe wall 2 is determined with sufficient resolution, e.g., to within 20 μm, then the process ends. If, however, the best match does not have sufficient resolution, then the range of the search is increased and the process of finding a best match continues (step S7).

Temperature Compensation/Velocity Calibration

The thickness measurement process hereinbefore described can take advantage of the fact that the apparatus which is used to measure wall thickness can also be used to measure a distance to a feature or a defect along the elongate structure and thus compensate for changes in shear velocity which depends on temperature.

Figure 21:
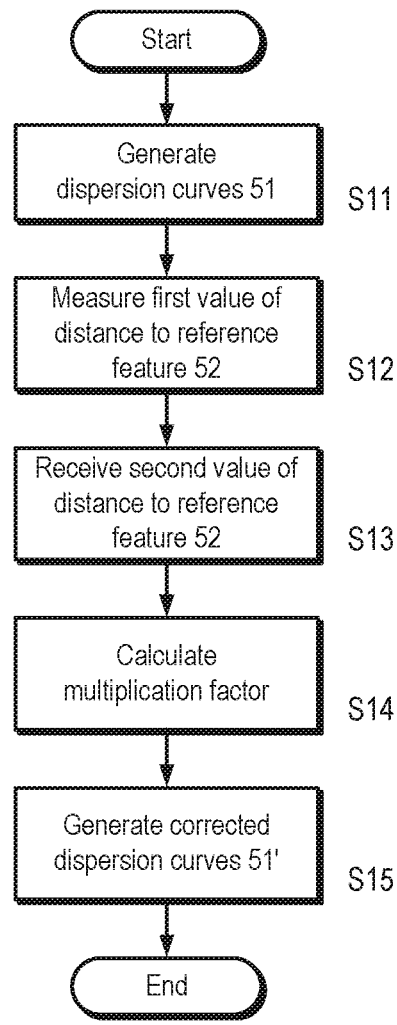
FIG. 21 is a process flow diagram of a method of wave speed calibration.

Referring to FIG. 21, the signal processing system 5 (FIG. 8) can be used to generate an initial set of dispersion curves for a given plate-like structure (i.e., a suitable elongate or extended structure) using initial values for shear velocity and density (step S11). Dispersion curves 51 can be generated for structures of any thickness and can be used to determine cut-off frequencies and, thus, which masks to use. The guided wave instrumentation 4 (FIG. 8) is used to perform a ranging measurement preferably using, in the case of a pipe, torsional modes between the inspection ring 3 and a reference feature 52, such as a weld or support (step S12) to find a time of arrival between the inspection ring 3 and the reference feature 52. The guided wave instrumentation 4 receives, from the user, a value of the distance, L, between the inspection ring 3 and the reference feature 52 (step S13). Knowing the distance, L, and the time of arrival, t, the speed of the torsional mode, $C_{T(0,1)}$, in the pipe wall (which depends on temperature) can be extracted from a pulse-echo time-of-flight measurement using $C_{T(0,1)} = 2 \times L/t$. This speed, $C_{T(0,1)}$, is equal to the bulk shear speed, $C_S$, which can then be used to generate a corrected set of dispersion curves.

During monitoring, variations in shear speed, $C_S$, (due to, for example, changes in temperature) can be corrected. A reference time-of-flight measurement can be performed to find, $T_{ref}$, and the reference value stored. A subsequent measurement of time-of-flight, T, and the using the reference value, $T_{ref}$, are used to calculate a multiplication factor, α (step S14). The computer system 5 (FIG. 8) uses the multiplication factor, α, to correct the shear velocity, $C_S$, and, thus, generate a new set of dispersion curves 51' (step S15).

Although torsional modes are described, other modes (such as longitudinal or flexural modes) can be used, although the process of determining shear speed is more complex. For a plate, a shear horizontal mode may be used. For a bar, a torsional mode may be used.

Thickness Measurement Using Individual Peak(s)

As explained earlier, a masking process can be used to determine the thickness of the elongate or extended structure (e.g. the thickness of the wall of a pipe). This can make use of information provided not only by the position(s) of the peak(s) but also by the separation of the peaks.

Notwithstanding this, in some embodiments, the thickness of the elongate or extended structure can be determined using two rows of transducers in pitch-catch mode using one row of transducers and an excitation signal (or composite excitation signal) lying in a range between 100 and 800 kHz to generate guided waves in the pipe, another row of transducers receive the guided waves, and the signals are measured to find the peaks in the frequency-domain signal and calculate thickness using $t=v/(2*f)$, where f is the measured frequency and v is velocity.

Modifications

It will be appreciated that various modifications may be made to the embodiments hereinbefore described. Such modifications may involve equivalent and other features which are already known in the design, manufacture and use of guided wave inspections systems and component parts thereof and which may be used instead of or in addition to features already described herein. Features of one embodiment may be replaced or supplemented by features of another embodiment.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method of determining a thickness of an elongate or extended structure using elastic waves, the method comprising:
    receiving at least one time-domain signal from a transducer;
    generating a frequency-domain signal in dependence upon the at least one time-domain signal;
    reducing noise in the frequency-domain signal to provide a de-noised frequency-domain signal;
    comparing the de-noised frequency-domain signal with at least two reference signals, each reference signal corresponding to a respective thickness;
    generating a score for each reference signal, each score indicating how closely the respective reference signal matches with the de-noised frequency-domain signal;
    determining which reference signal most closely matches with the de-noised frequency-domain signal based on the scores; and
    determining the thickness of the elongate or extended structure based on which reference signal most closely matches the de-noised frequency-domain signal.

2. The method of claim 1, comprising:
    receiving at least two time-domain signals from the transducer;
    wherein generating the frequency-domain signal comprises:
    converting the at least two time-domain signals into at least two frequency-domain signals; and
    combining the at least two frequency-domain signals into the frequency-domain signal.

3. The method of claim 2, wherein the at least two time-domain signals comprise three time-domain signals.

4. The method of claim 3, wherein the three time-domain signals comprise first, second and third time-domain signals corresponding to measurements of first, second and third excitations at first, second and third frequencies respectively.

5. The method of claim 2, further comprising:
    windowing each of the at least two time-domain signals prior to generating the frequency-domain signal.

6. The method of claim 1, comprising:
    receiving at least two time-domain signals from the transducer; wherein generating the frequency-domain signal comprises:
    combining the at least two time-domain signals into a single, combined time-domain signal; and
    converting the single, combined time-domain signal into the frequency-domain signal.

7. The method of claim 1, wherein reducing the noise in the frequency-domain signal comprises:
    reducing or removing coherent noise from the frequency-domain signal.

8. The method of claim 1, wherein reducing the noise in the frequency-domain signal comprises:
    reducing or removing incoherent noise from the frequency-domain signal.

9. The method of claim 1, wherein reducing the noise in the frequency-domain signal comprises:
    performing Welch's method on the frequency-domain signal.

10. The method of claim 1, wherein comparing the de-noised frequency-domain signal with at least two reference signals comprises:
    performing a convolution of the de-noised frequency-domain signal with each of the at least two reference signals.

11. The method claim 1, wherein comparing the de-noised frequency-domain signal with at least two reference signals comprises:
    performing a cross-correlation of the de-noised frequency-domain signal with each of the at least two reference signals.

12. The method of claim 1, wherein comparing the de-noised frequency-domain signal with the at least two reference signals comprises:
    multiplying a matrix comprising a set of masks by a first vector containing measured signal values for different frequencies to obtain a second vector, wherein each mask contains a series of values extending along a first direction corresponding to values at different frequencies, the set of masks are arranged along a second, orthogonal direction and the first vector contains a series of measured signal values extending along the second direction.

13. A method comprising:
    performing a guided wave ranging measurement of a reference feature in an elongate or extended structure using at least one transducer in a first set of transducers to determine a value of a distance to the reference feature;
    calculating a multiplication factor for a velocity of a guided wave mode using the value of the distance; and
    performing the method of claim 1 using a velocity adjusted using the guided wave ranging measurement.

14. The method of claim 3, wherein performing the guided wave ranging measurement comprises using a T(0,1) mode or SH0 mode.

15. A computer program product comprising a non-transitory computer-readable medium storing a computer program which, when executed by at least one processor, causes the at least one processor to perform the method of claim 1.

16. A method comprising:
receiving a nominal value of a thickness of an elongate or extended structure;
providing an excitation signal to at least one transducer in a first set of transducers, the excitation signal having a frequency range which contains a cut-off frequency for a dispersive guided wave mode in the elongate or extended structure having the nominal value of the thickness; and
receiving guided wave(s) using at least one transducer in a second, different set of transducers.

17. A method comprising:
providing at least one excitation signal to at least one transducer in a first set of transducers, the at least one excitation signals covering a sufficiently broad frequency range to contain cut-off frequencies for at least two dispersive guided wave modes in an elongate or extended structure; and
receiving guided waves using at least one transducer in a second, different set of transducers.

18. The method of claim 17, wherein the sufficiently broad frequency range is contained within a range between 50 kHz to 800 kHz and at least a portion of the sufficiently broad frequency range extends above 100 kHz.

19. An apparatus for determining a thickness of an elongate or extended structure using elastic waves, the apparatus comprising:
at least one processor; and
memory;
wherein the at least one processor is configured to perform the method claim 1.

20. The apparatus of claim 19, which is a computer;
wherein the computer further comprises:
a network interface;
wherein the computer is configured:
to receive the at least one time-domain signal from a guided wave inspection system; and
to determine the thickness of the structure in dependence upon the at least one time-domain signal.

* * * * *